(12) United States Patent
Seefried

(10) Patent No.: US 6,336,825 B1
(45) Date of Patent: Jan. 8, 2002

(54) ELECTRICAL CONNECTOR WITH LIGHT-GUIDING BODY

(75) Inventor: Roland Seefried, Heidelberg (DE)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 09/476,522

(22) Filed: Jan. 3, 2000

Related U.S. Application Data

(63) Continuation of application No. 08/983,307, filed as application No. PCT/DE96/00522 on Mar. 26, 1996.

(30) Foreign Application Priority Data

Mar. 26, 1995 (DE) ............................................. 195 10 467
Apr. 6, 1995 (DE) ............................................. 195 12 915

(51) Int. Cl.⁷ ................................................. H01R 3/00
(52) U.S. Cl. ........................ 439/488; 439/490; 439/910
(58) Field of Search .................................. 439/488, 489, 439/910, 491, 490; 362/291, 32, 304

(56) References Cited

U.S. PATENT DOCUMENTS

| | | | | |
|---|---|---|---|---|
| 5,062,807 A | * | 11/1991 | Guss, III | 439/490 |
| 5,244,409 A | * | 9/1993 | Guss, III et al. | 439/490 |
| 5,349,504 A | * | 9/1994 | Simm et al. | 362/304 |
| 5,409,398 A | * | 4/1995 | Chadbourne et al. | 439/490 |
| 5,554,049 A | * | 9/1996 | Reynolds | 439/490 |
| 5,613,873 A | * | 3/1997 | Bell, Jr. | 439/490 |
| 5,704,709 A | * | 1/1998 | Zwick et al. | 362/304 |

FOREIGN PATENT DOCUMENTS

| | | | | |
|---|---|---|---|---|
| DE | G8201605.4 | * | 5/1982 | |
| DE | P3637191.2-34 | * | 9/1987 | |
| DE | G9115984.9 | * | 7/1992 | |
| DE | P4123788.9 | * | 1/1993 | |

* cited by examiner

Primary Examiner—Paula Bradley
Assistant Examiner—Ross Gushi
(74) Attorney, Agent, or Firm—Horst M. Kasper

(57) ABSTRACT

An electrical connector is disclosed with electrically contacting contact pins or contact sockets, such as plugs or couplings. The electrical connector exhibits on one side a receiver part. A light-guiding body made of a light-transmitting material with at least one illuminating body is inserted into the receiver part. Feed lines for contact pins are led through the receiver part. The light-guiding body is furnished with at least two arms. Reflection surfaces are furnished for deflecting light coming from an illuminating body into the two arms. The reflection surfaces deflect light into the respective arm and are capable of deflecting the light mainly in axial direction within the respective arm at an angle of from between about 40 to 140 degrees relative to the main radiation direction of the arm. The light-guiding or light-conducting body exhibits a recess below the tip or edge and the illuminating body is disposed in the recess.

20 Claims, 7 Drawing Sheets

ELECTRICAL CONNECTOR WITH LIGHT-GUIDING BODY

This application is a continuation of application Ser. No. 08/983,307, filed of Dec. 30, 1997, now pending which is a 371 of PCT/DE96/00522, filed on Mar. 26, 1996.

CROSS-REFERENCES TO RELATED APPLICATIONS (Not Applicable)

STATEMENT REGARDING FEDERALLY SPONSORED RESEARCH OR DEVELOPMENT (Not Applicable)

REFERENCE TO A "MICROFICHE APPENDIX" (SEE 37 CFR 1.96)

(Not Applicable)

BACKGROUND OF THE INVENTION

1. Field of the Invention
Technical Field

The invention relates to an electrical connector with electrically contacting contact pins or contact sockets such as plugs or couplings, which includes a device for deflecting light in preferred directions of the illuminating body emitting a light, such as a light-emitting diode LED or other diode or incandescent bulb, in particular for the operating display of a illuminating body of electrical circuits in casings with view windows.

2. Description of the Related Art Including Information Disclosed Under 37 CFR 1.97 and 1.98
State of the Art Frequently, a light-emitting diode or incandescent bulb is required for a display of specific states of the electrical circuit in connection with electronic circuits, which are located or encapsulated in shells or casings. In this context, if possible, the light-emitting diode or incandescent bulb should be visible from several sides such that the view angle for the observer becomes as large as possible. For this it is known to drill four holes staggered in each case at an angle of 90 degrees into shells or into casings for proximity switches. The light-emitting diode can then be seen from four sides through the four holes. The light-emitting diode is normally disposed in a plug insert and the plug insert is inserted into the shell or into the casing. The disadvantage of such arrangements comprises that, upon employment of a light-emitting diode, the light-emitting diode is associated with a radiation characteristic, which radiates for practical purposes only along the longitudinal axis of the light-emitting diode or, respectively, of the shell, such that the light-emitting diode appears to be only weakly illuminating in case of a lateral view through the laterally disposed windows. In case of small operating currents of the light-emitting diode and upon radiating in the direction of the axis of the shell or of the casing, there hardly remains any light which can exit radially through the view windows.

A multi-pole electrical plug connector device became known through the printed patent document DE 37 03 423 A1, which multi-pole electrical plug connector device includes a cable plug and an apparatus part with a front plug part for receiving the cable plug. The cable plug is furnished with light conductors in order to be able to monitor therewith the operating status of the apparatus part. The light conductors are furnished inside of the cable plug, wherein the light conductors are furnished as right-angled rigid rods made of a clear transparent plastic with a reflection face disposed in the bend of the rod, which reflection face exhibits an inclination angle of 45 degrees, such that a 90-degree reflection of the light passing through the light conductor is given.

Lamps are known from the British printed patent document GB 607,922 A which exhibit massive curved arm-shaped light-guiding bodies of different forms, where an incandescent bulb is disposed at a front side end of the light-guiding bodies, wherein the light of the incandescent bulb exits at the other end of the light-guiding body. Such light-guiding bodies are also known from the citation in the literature A. M. Blumenfeld and S. E. Jones: Parts That Glow, in: Machine Design, Oct. 29, 1959, pp. 94 through 103.

A disk-shaped light-guiding body made of clear transparent plastic in the shape of quarter circles is known from the U.S. Pat. No. 5,349,504, which light-guiding bodies are combined in parallel to a set. Diodes are disposed at a front side radial delimiting face of in each case one disk, wherein the light of the diodes is deflected by 90 degrees within the disk, which light is deflected after reflection at the curved delimiting face of the disk and which light exits again approximately at a right angle through two arms disposed at the disk, wherein the two arms are directed perpendicular to that delimiting face, in which face the diodes are disposed, such that a 90 degree reflection of the light is furnished. The set can be plugged with pins onto a printed circuit board.

Furthermore, a diode is known which is furnished with a on top-positioned, beaker-shaped screen in the main radiation direction of the light, wherein the main radiation direction of the light coincides with the longitudinal axis of the diode, and wherein the top-positioned, beaker-shaped screen somewhat expands the incident radiation.

BRIEF SUMMARY OF THE INVENTION

Technical Object

It is an object of the invention to furnish an electrical connector of the kind recited, which electrical connector deflects the radiation of an illuminating body preferably at a right angle relative to the main radiation direction of the illuminating or light body or, respectively, of the casing for the purpose of making the radiation of the illuminating body better visible from the side, wherein the illuminating body is disposed inside the casing, such that the illuminating body is visible brightly luminous from a plurality of sides of the connector.

Disclosure of the Invention and its Advantages

The solution of the object of the invention comprises an electrical connector with electrically contacting contact pins or contact sockets, such as plugs or couplings. Said connector exhibits on one side a receiver part, into which receiver part there is inserted a light-guiding body made of a light-transmitting material with at least one illuminating body. Feed lines for the contact pins are led through the receiver part. The light-guiding body is furnished with at least two arms. The two arms exhibit at their abutting ends on the side opposite to the illuminating body a surface which is planar inclined or curved in direction of the longitudinal axis of the main radiation direction of the illuminating body. The surface forms in each case the reflecting deflection surface of the respective arm and is capable of deflecting the light mainly in axial direction within the respective arm at an angle of from between about 40 to 140 degrees relative to the main radiation direction of the arm. The reflecting deflection faces of the arms in each case impact each other jointly in the axis of the main radiation direction of the illuminating body in a tip or edge directed into the light-conducting body. The light-guiding or light-conducting body exhibits a recess below the tip or edge, wherein the illuminating body is disposed in the recess.

The electrical connector according to the present invention is associated with the advantage that the connector deflects and laterally reflects visible light or infrared or ultraviolet light emitted by the illuminating body, such as a luminescent element, light-emitting diode or other diode or incandescent bulb, from the direction of the main radiation direction of the illuminating body, wherein the main radiation direction is in particular the longitudinal axis of the light or illuminating body, such that the reflected light exits at an angle of between about 40 to 140 degrees depending on the direction of the arms, wherein the direction of the arms relative to the center axis of the light-guiding body can also amount to between about 40 to 140 degrees. In case of an embodiment of the light-guiding body with a deflection angle of about 90 degrees, the light-guiding body preferably comprises two pairs of arms disposed in a plane and having the same length and aligned in an antiparallel direction and crossing each other at a right angle, such that the light of the illuminating body is mainly deflected at a right angle relative to the main radiation direction of the illuminating body. Thereby, the illuminating body can be seen or be detected brightly luminous laterally at the circumference of a shell or of a casing, because the substantially largest part of the radiation of the illuminating body is deflected and exits to the outside through the outer front faces of the arms. View windows are disposed inside of a shell or of a casing in the region of these front faces of the arms, such that the illuminating body can be easily seen or detected from the outside. Thus, the light-guiding body advantageously operates as a collimator.

Furthermore, the increase in the illuminating density can not only be obtained by deflecting the light from the longitudinal axis of the illuminating body by a predetermined angle of preferably 90 degrees, but also by bundling the light in the arm itself or in the arms themselves. Thus, the deflection is performed in preferred directions. The arms can be radially formed or molded at an end of the light-guiding body and the arms can form two arm pairs disposed in a plane, crossing each other and aligned antiparallel relative to each other, wherein the arms are of solid material. The reflecting deflection faces of the arms can in each case form part of an ellipsoid or of a paraboloid or of a cylinder jacket or can be planar faces, which exhibit a deflection angle of about 90 degrees, wherein the illuminating body reaches into the region of the abutting ends of the arms within the recess, and wherein the recess reaches up to below the tip.

Advantageously, the plug can exhibit a beaker on the side disposed opposite to the illuminating body, wherein the beaker is sitting on the arms of the light-guiding body and contains the contact pins, wherein the plug and the beaker are formed cylindrically or parallelepipedally and the front faces of the arms are disposed in the jacket plane of the cylinder or in the delimiting faces of the parallelepiped of the plug. Furthermore, the light-guiding body can exhibit two or three or five or six arms disposed in the shape of a star, wherein the arms have the same arcuate distances from each other, wherein the illuminating body is disposed centered or off-centered below the abutting ends of the arms. The inclined surfaces of the opposing arms of the light-guiding body, which inclined surfaces form in each case the reflecting deflection face of the respective arm, can be formed in each case as holographic lenses or as holographic mirrors. The light-guiding body itself can bundle the light of at least one illuminating body into at least one or several preferred directions. The light, exiting from a illuminating body and expanding and propagating in the light-guiding body can be thrown onto at least two different reflection faces of two different arms through a mirror face of the light-guiding body and can exit out of the arms in a focussed way. Furthermore, the illuminating body and can be identical to the light-guiding body and can exhibit the desired shape of the light-guiding body.

The reflecting deflection faces can reflect based on total reflection or they can be formed as a mirror with a reflecting layer in an inward direction toward the light-guiding body. The inclined surfaces, which form in each case the reflecting deflection face for the respective arm, can be disposed at the foot of the recess as a projection with inclined surfaces within the recess for the illuminating body. Similarly, the light-guiding body can be furnished with a plurality of inclined and reflecting surfaces, coordinated to each other, wherein light bundles, exiting from an illuminating body between coordinated surfaces are multiply reflected inside of the light-guiding body and are led toward the outside of the light-guiding body.

A plurality of illuminating bodies can be employed within one and the same light-guiding body instead of a single illuminating body. The light-guiding body can be formed cylindrically or parallelepipedally, and the pairs of arms can exhibit the same length in an antiparallel direction. The arms can be radially molded to an end of the light-guiding body and can form two antiparallel pairs of arms crossing each other and disposed in a plane. The arms are preferably of solid material.

The reflecting deflection faces of the arms can be in each case a part of an ellipsoid or of a paraboloid or of a cylindrical jacket or planar faces, which exhibit a deflection angle of about 90 degrees, wherein the illuminating body reaches into the region of the abutting ends of the arms in the recess and the recess reaches up to below the tip.

BRIEF DESCRIPTION OF THE SEVERAL VIEWS OF THE DRAWINGS

Short description of the drawing, where there is shown in.

DETAILED DESCRIPTION OF THE INVENTION

Figure 1:
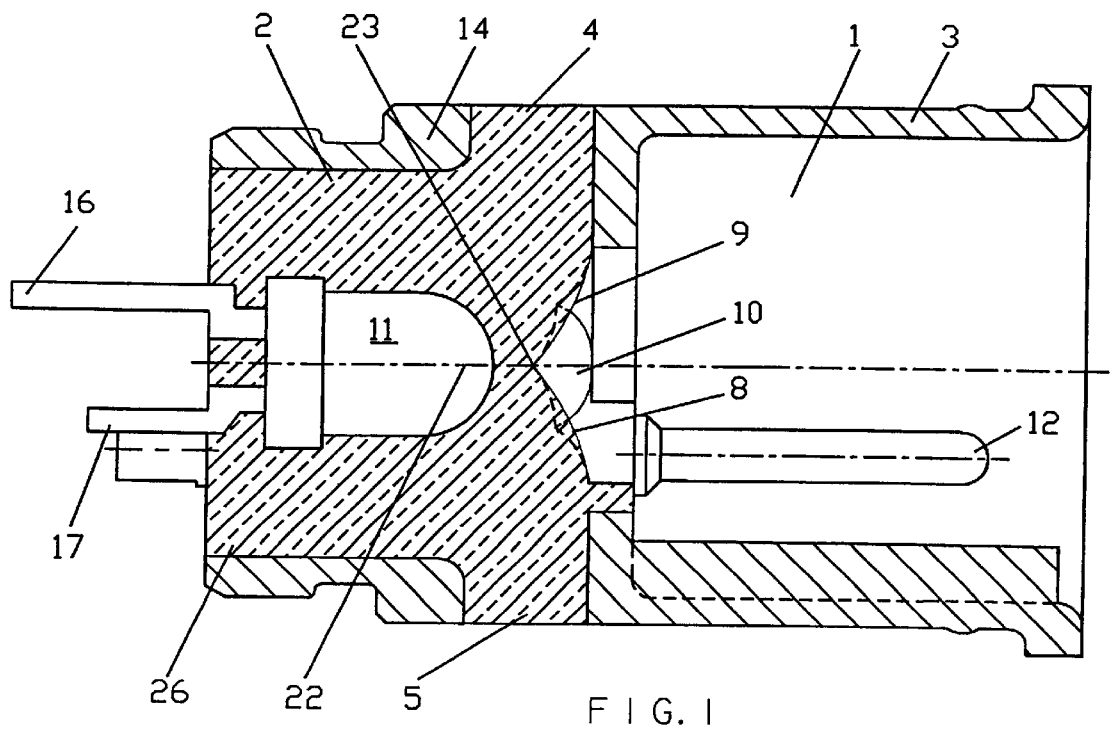
FIG. 1 a cross-sectional view through an electrical connector with a light-guiding body and with an illuminating body, which cross-section represents a section along section line A–B in FIG. 4.

An electrical connector is illustrated in the figures as a plug 1 in various views and sections, wherein a specifically formed light-guiding body 2 is disposed in the electrical connector, which light-guiding body 2 is directed to the requirements of the plug 1 and which light-guiding body consists of a transmitting or, respectively, transparent material and is produced as a molded part.

The light-guiding body 2 comprises essentially two crossed pairs of arms 4, 5, 6, 7, crossing each other preferably at right angles and disposed in a plane. The arm pairs preferably exhibit the same length. The arms 4, 5, or, respectively, 6, 7 of a pair of arms can be directed in antiparallel directions. A cylindrical or parallelepipedal body 26 is molded at these pairs of arms 4, 5, or, respectively 6, 7, centered on one side. The cylindrical or parallelepipedal body 26 exhibits a recess 15, which recess 15 is preferably formed as a blind hole 15 and which serves for receiving an illuminating body 11. The illuminating body 11 can preferably be a luminescence diode, a light-emitting diode LED, or other diode or also an incandescent bulb. A surface, concavely curved in direction of the longitudinal axis 22 of the main radiation direction of the illuminating body 11 or, respectively, of the center axis of the light-conducting body, is in each case molded at the side disposed opposite to the illuminating body 11 at the abutting ends of the respective arms 4, 5, 6, 7. Said concave curved surfaces form in each case the reflecting deflection face 8, 9, 10, 18 of the respective arm 4, 5, 6, 7. These deflection faces are in each case part of an ellipsoid or of a paraboloid or of a cylinder jacket or part of planar inclined faces. These deflection faces, in case of at least three arms meeting like a star, jointly abut in a tip 23 directed inside the light-guiding body 2 in the axis 22 of the main radiation direction of the illuminating body 11 and these deflection faces deflect the reflected light inside of the arms 4, 5, 6, 7. In each case, the elliptically or parabolically or otherwise shaped deflection faces abut to each other. The reflecting deflection faces 8, 9, 10, 18 of the arms 4, 5, 6, 7 can reflect either according to total reflection or the deflection faces can be metalized with a reflection layer in direction toward the inside to the light-guiding body 2.

The shape of the surface curvature or surface inclination of the reflecting deflection faces can be as desired, the reflecting deflection faces can be disposed on the outside at the light-guiding body or inside of the light-guiding body. For example, if the device is a furnished with four arms having in each case a planar inclined deflection face, then the deflection faces include a pyramid placed upside down or an inverted pyramid; if the device has only two arms disposed opposite to each other with planar inclined deflection faces, then the deflection faces include a prism. Similarly, the light-guiding body can be produced as a single piece or can be composed of several parts.

Advantageously, the selected shape for the deflection faces is an ellipsoid, wherein one focus point of the ellipsoid is the illuminating body 11, and wherein the second focus point of the ellipsoid is the eye of the viewer. In this manner the light emitted through the outer front faces of the lateral arms 4, 5, 6, 7 can be seen best.

The light-guiding body 2 can be inserted into a receiver part 14, wherein the receiver part is a part of the electrical connector 1. A beaker 3 of the connector 1 is placed on the arms 4, 5, 6, 7 on the side disposed opposite to the illuminating body 11 and thus disposed toward the deflection faces 8, 9, 10, 18. Three contact pins 12, 13, 19 protrude into the beaker 3 for connection with a coupling, not illustrated. The beaker 3 has a recess in the floor for the deflection faces 8, 9, 10, 18. The contact pins 12, 13, 19 can be solidly connected to the beaker 3 according to the present embodiment of the light-guiding body 2. Feed lines 24, 25 for the contact pins 12, 13, 19 lead through the receiver part 14 and past the cross-aligned arms 4, 5, 6, 7 to the contact pins 12, 13, and 19. Feed lines 16, 17 for the illuminating body 11, preferably the anode A and the cathode K of a light-emitting diode LED, protrude through the lower front face of the connector for providing contact.

Figure 2:
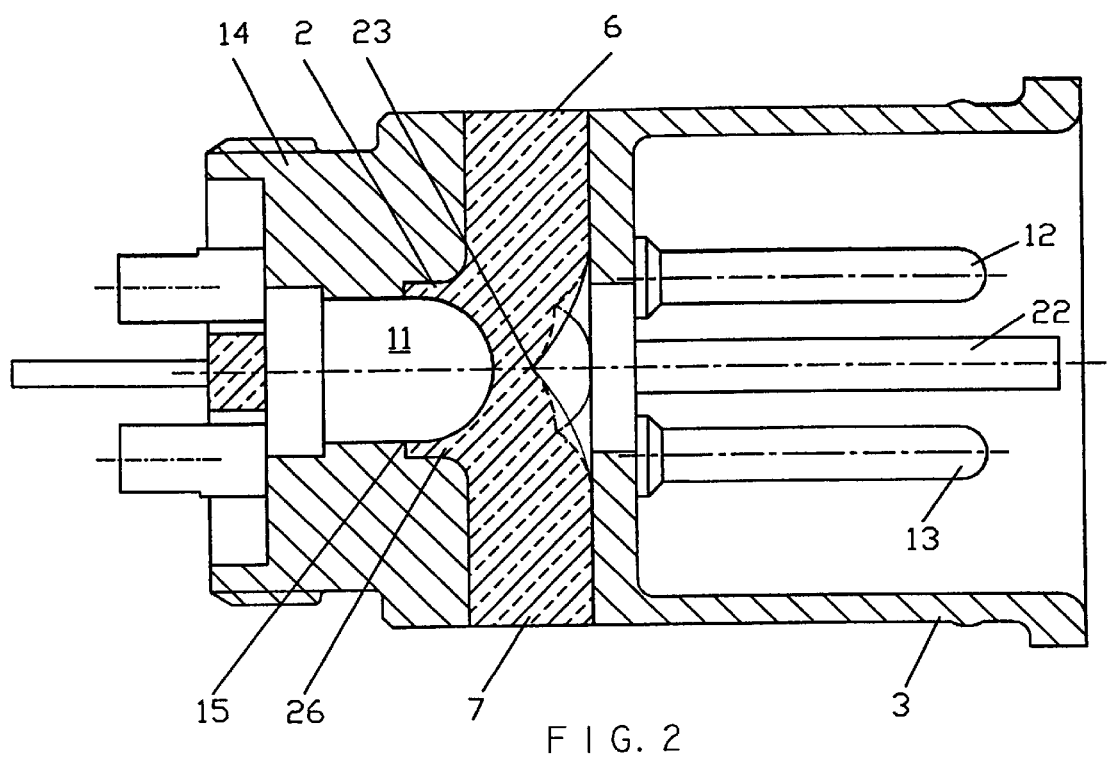
FIG. 2 a sectional view rotated by 90 degrees relative to FIG. 1 and along section line C–D in FIG. 4.
Figure 3:
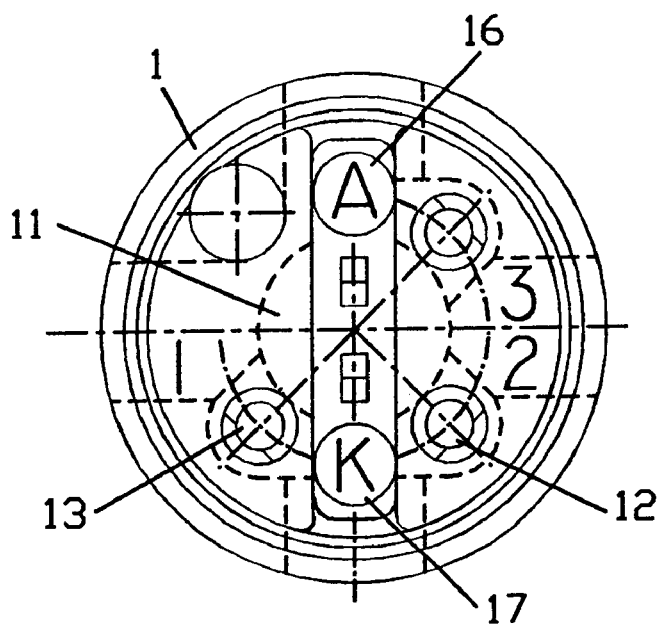
FIG. 3 a top planar view onto the lower front face of the electrical connector, through which front face the illuminating body is inserted.
Figure 4:
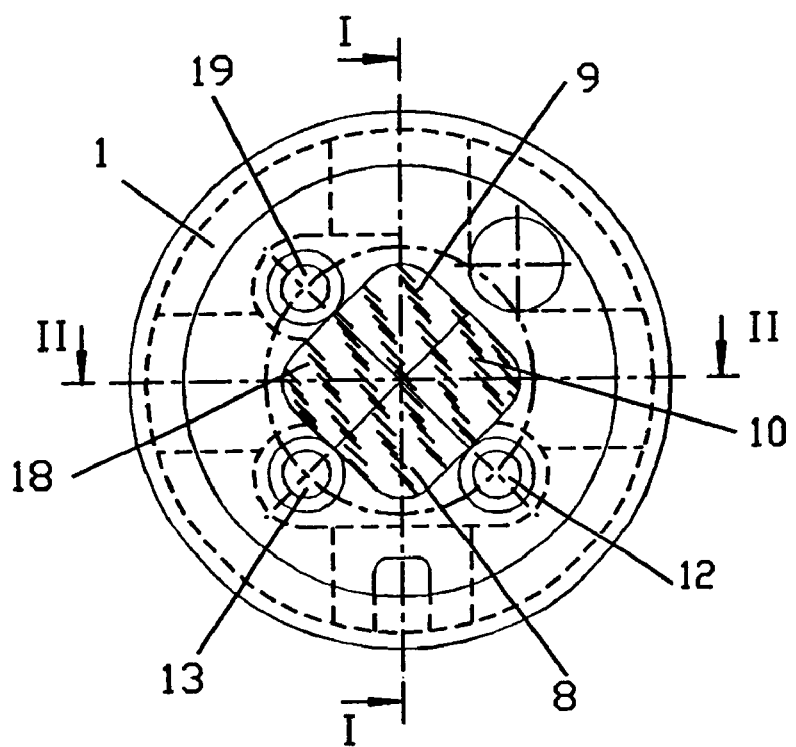
FIG. 4 a top planar view onto the electrical connector from the top into the beaker and onto the contact pins as well as onto the deflection faces.
Figure 5:
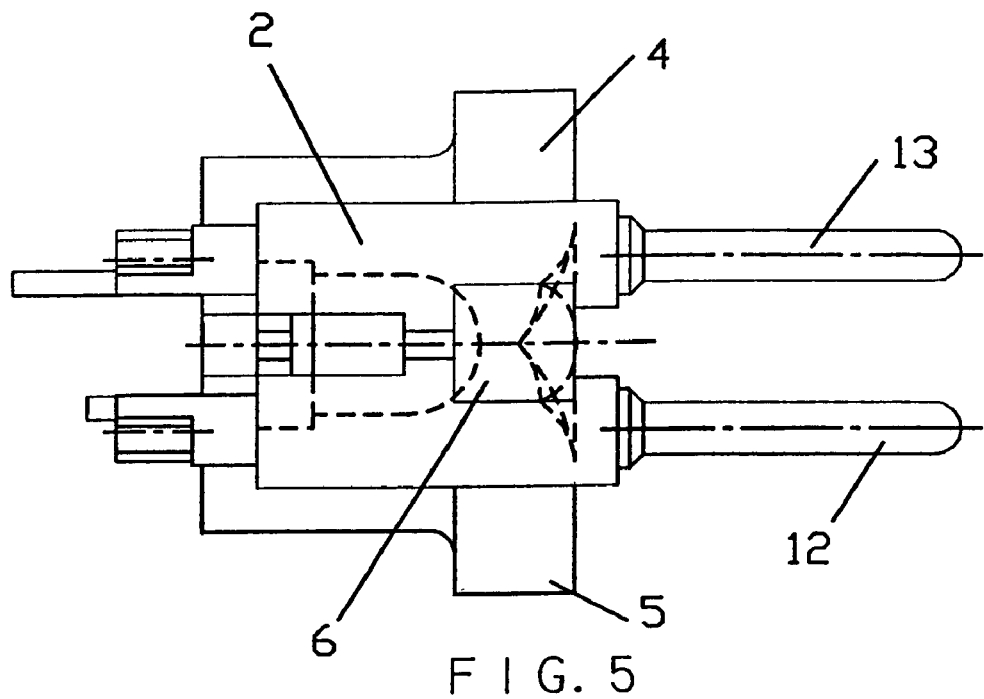
FIG. 5 a view of the light-guiding body with contact pins and feed lines.
Figure 6:
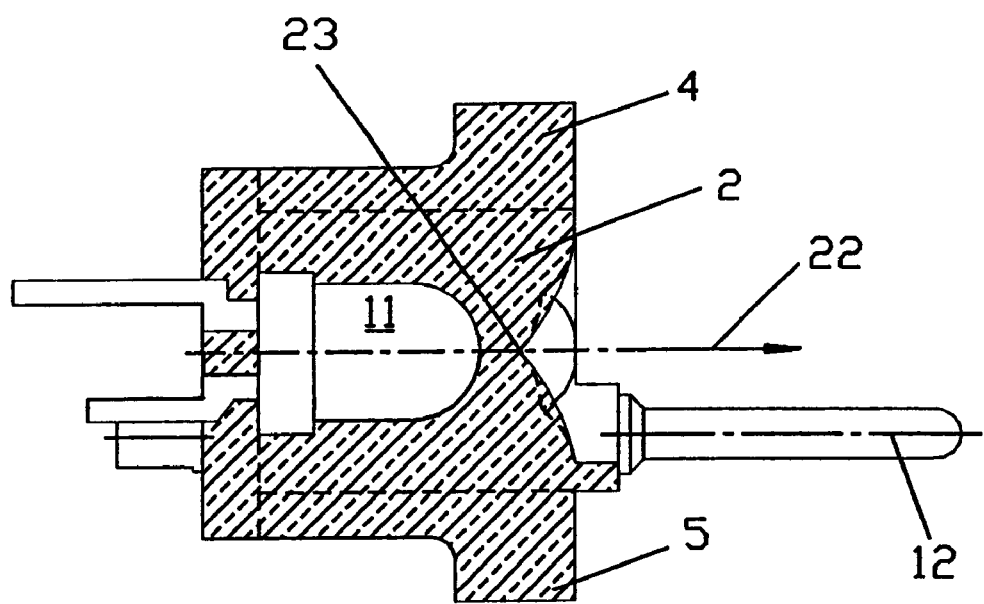
FIG. 6 a section through the light-guiding body.
Figure 7:
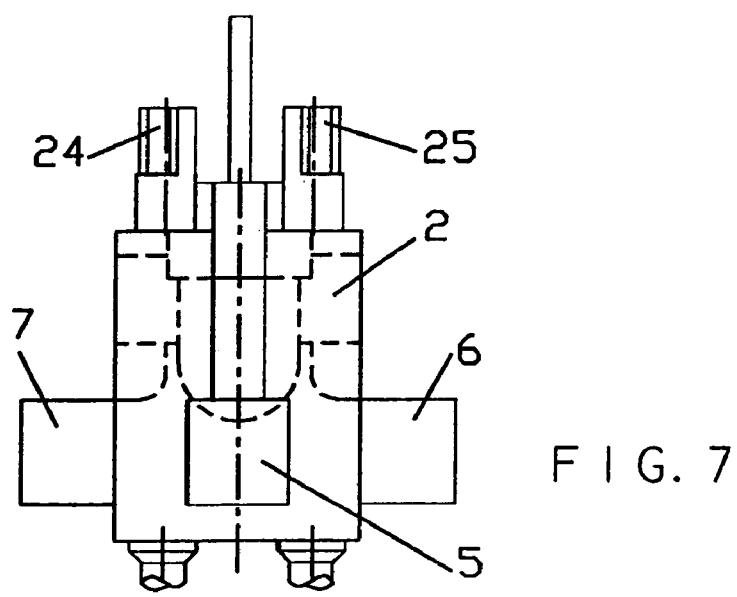
FIG. 7 a view of the light-guiding body according to FIG. 5 rotated by 90 degrees.
Figure 8:
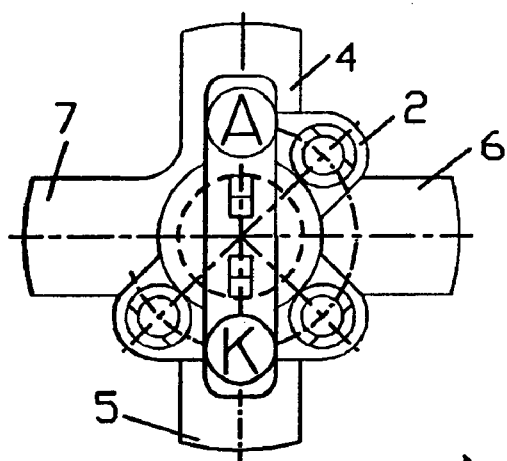
FIG. 8 a top planar view onto the front face of the light-guiding body in a direction of the illuminating body.
Figure 9:
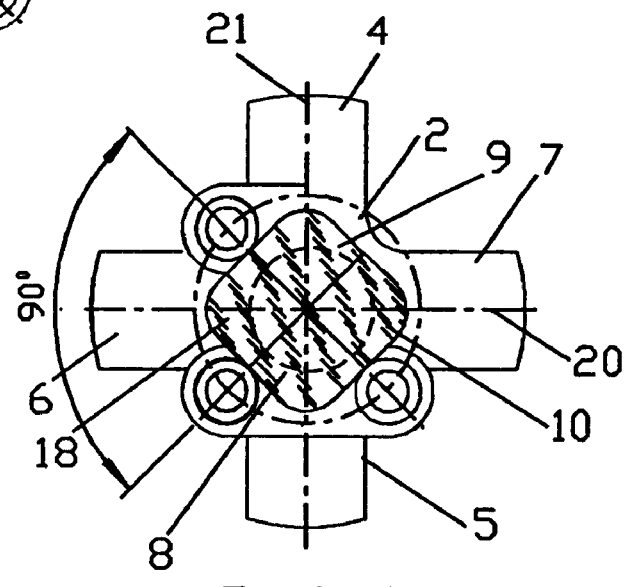
FIG. 9 a top planar view on to the oppositely disposed upper front face of the light-guiding body in a direction of the contact pins.

The connector 1 can also exhibit a cylindrical or also a parallelepipedal form as can be recognized from FIGS. 1 and 2, wherein the front faces of the remote disposed ends of the arms 4, 5, 6, 7 are disposed inside of the jacket face or inside of the side faces of the connector 1.

The light-guiding body to can be formed from arms, joining together in the shape of a star, or also only of two arms with centrally molded-on deflection faces also without contact pins according to the embodiments of the present invention in its simplest case, and can also be employed in applications other than in an electrical connector.

Figure 10:
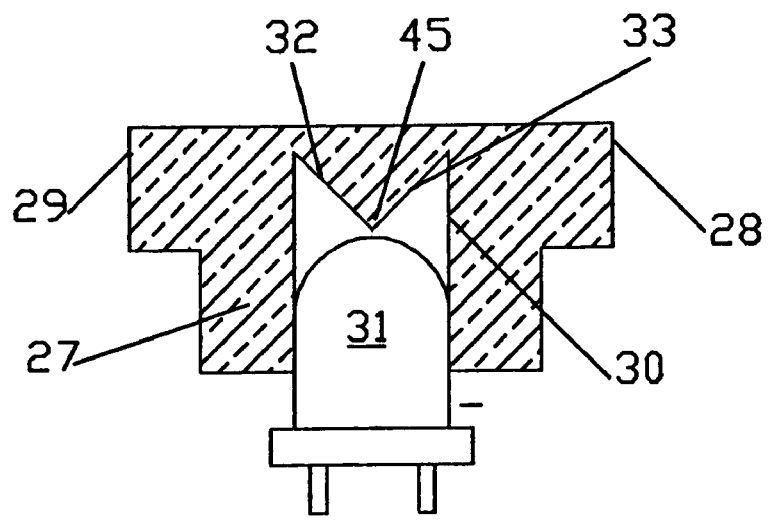
FIG. 10 a section through a light-guiding body with inclined and reflecting surfaces disposed inside of the light-guiding body, for example, inside of the receiving bore opening for the illuminating body.
Figure 11:
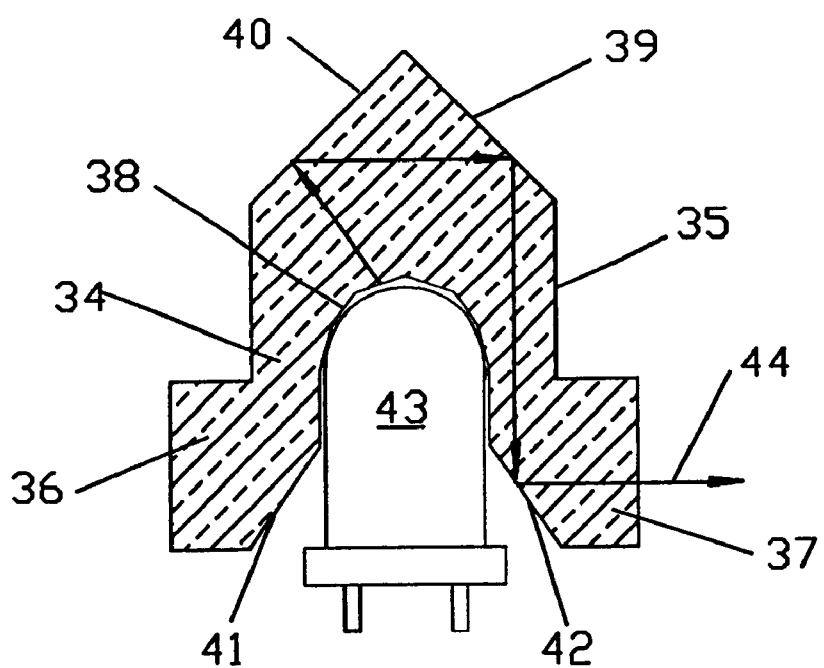
FIG. 11 a section through a further light-guiding body with multiple, reflecting surfaces, wherein the reflected light is multiply reflected inside of the light-guiding body.

FIGS. 10 and 11 show two further examples of light-guiding bodies 27, 34, wherein a section through a light-guiding body 27 with arms 28, 29 as well as with inclined and reflecting surfaces 32, 33 disposed within the light-guiding body 27 is illustrated in FIG. 10, for example within a receiver bore 30 for an illuminating body 31. The light-guiding body 27 is again formed as a collimator and can be a hollow body with receiver opening 30, wherein the receiver opening 30 is for example as central blind hole 30, and wherein the illuminating body 31, for example a diode 31, is disposed in the central blind hole 30. A projection 45 with bevel inclined delimiting faces 32, 33 is disposed centrally inside at the foot of the blind hole, for example, a cone or a pyramid or a prism 45, which delimiting faces 32, 33 deflect the light falling onto them and through the arms 28, 29 of the light-guiding body 27. Similarly, the reflecting projection 45 inside of the blind hole 30 can be an acutely converging cone with a peripherally surrounding jacket face.

FIG. 11 shows a section through a light-guiding body 34, which light-guiding body 34 is formed as a hollow body with a blind hole 38 for receiving an illuminating body 43. The light-guiding body 34 exhibits outwardly disposed, bevel inclined reflecting surfaces 39, 40 at its upper end neighboring the tip of the illuminating body 43, which surfaces 39, 40 reflect the light bundle 44 of the illuminating body 43 into the interior of the light-guiding body 34. The deflected light bundles 44 pass onto bevel inclined surfaces 41, 42, disposed at the lower end of the light-guiding body 34 for, which surfaces 41, 42 deflect in turn the light bundles 44 and direct the light bundles 44 toward the outside through arms 36, 37 attached in the lower region of the light-guiding body 34. For example, the bevel inclined surfaces 41, 42 can be formed and molded as a conical expansion inside a part of the blind hole 38, preferably in the starting region of the blind hole 38; similarly the surfaces 41, 42 can be bevel inclined planar faces. This embodiment of the light-guiding body 34 thus is furnished with multiple inclined and reflecting surfaces coordinated to each other, wherein the reflected light 44 is multiply reflected inside of the light-guiding body 34. The arms 36, 37 of the light-guiding body 34 can be substantially arbitrarily molded at the light-guiding body based on this embodiment.

The illuminating body does not have to be mounted below the mirror planes, rather the light can pass on a desired path into the light-guiding body. The illuminating body can be mounted at a distance from the light-guiding body according to an associated embodiment, wherein the light of the illuminating body is the led, for example reflected, into the light-guiding body disposed at a distance. Furthermore, the inclined surfaces of the arms of the light-guiding body, disposed opposite to each other, can in each case be holographic lenses or holographic mirrors, wherein the inclined surfaces form in each case the reflecting deflection face of the respective arm.

Figure 12:
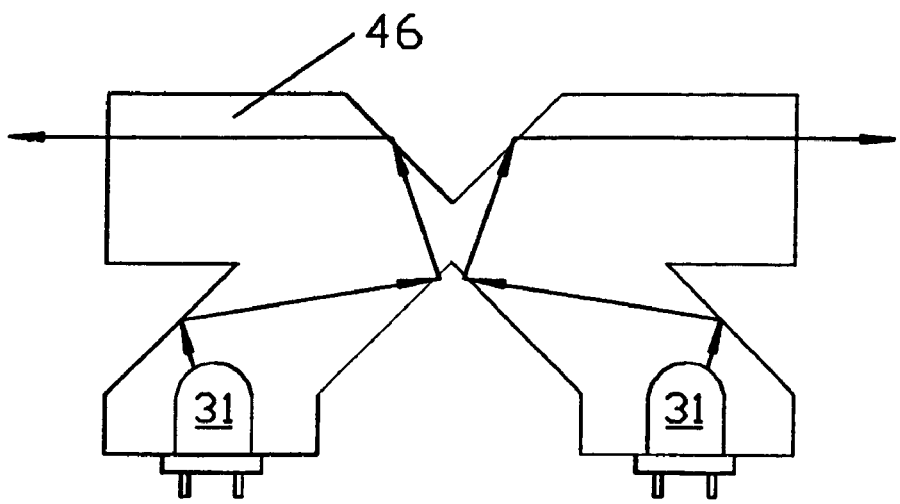
FIG. 12 an example of a light-guiding body with two illuminating bodies for different arms of the light-guiding body.

Advantageously, also a plurality of illuminating bodies can be employed within one and the same light-guiding body 46 instead of a single illuminating body; such an example is illustrated in FIG. 12. A light-guiding body 46, which can for example be constructed with a mirror symmetry plane, has several arms with reflecting faces. A light-emitting diode 31 is disposed in each case in two corners, disposed opposite to each other, at the base of the light-guiding body 46, wherein the light of the light-emitting diode 31 is led over various reflection faces of the light-guiding body 46 into in each case one of the coordinated arms and exits from this arm. In this case, illuminating bodies of different colors can also be employed.

Figure 13:
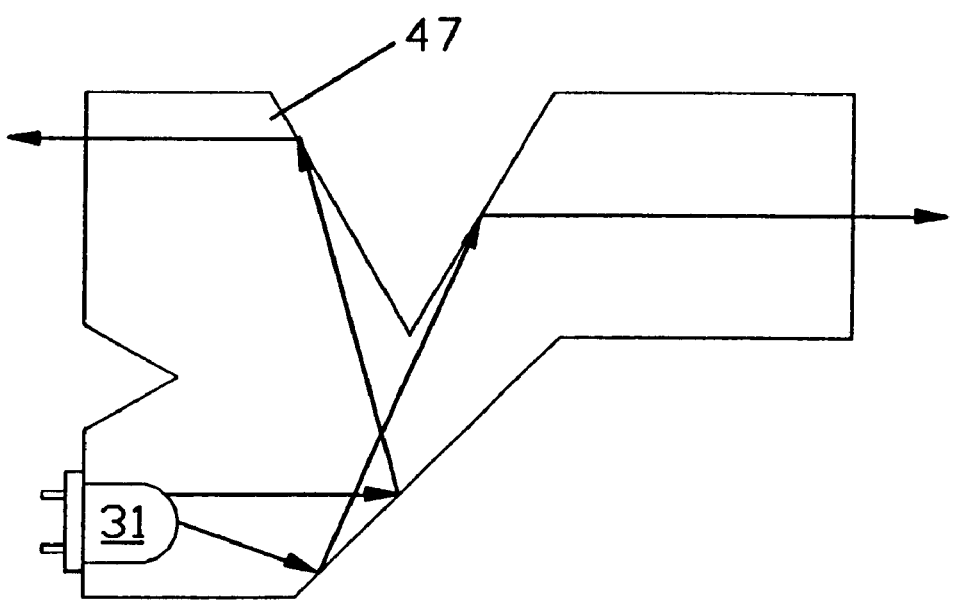
FIG. 13 an example of a light-guiding body, which light-guiding body itself focuses or, respectively, bundles the light of at least one illuminating body.

A further example of a light-guiding body is shown in FIG. 13, wherein the light-guiding body 47 itself bundles the light of at least one illuminating body into at least one or several preferred directions. The light emitted from at least one illuminating body 31 and expanding in the light-guiding body 47 is thrown through at least one mirror face or reflection face of the light-guiding body 47 onto at least two different reflection faces of at least two different arms and is focussed there, whereafter the light exits out of the faces of the arms furnished for this purpose.

According to a further embodiment of the connector, the illuminating body can be identical to the light-guiding body and the illuminating body or, respectively, the casing of the illuminating body can exhibit the desired shape of the above described light-guiding body. For example, laterally light-irradiating arms and laterally light-reflecting deflection faces are disposed in this case at the light-guiding body or, respectively, at the casing of the light-guiding body.

COMMERCIAL APPLICABILITY

The electrical connector is preferably to be employed there, where a complete plug insert together with an illuminating body and a light-guiding body is required, which plug insert can be incorporated in an advantageous manner into a plurality of electronic circuits for monitoring specific states to be displayed or to be detected.

List of Reference Numerals:

| | |
|---|---|
| 1 | plug with diode |
| 2, 27, 34, 46, 47 | light-guiding body |
| 3 | beaker |
| 4, 5, 6, 7, 28, 29, 36, 37 | arms |
| 8, 9, 10, 18, 32, 33, 39, 40, 42, 42 | deflection faces |
| 11, 31, 41 | diodes |
| 12, 13, 19 | pins |
| 14 | receiver part |
| 15, 30, 38 | central blind hole |
| 16, 17 | feed lines of the diode |
| 20, 21 | directions of the axis |
| 22 | longitudinal axis |
| 23 | tip |
| 24, 25 | feed lines |
| 26 | body |
| 44 | multiply broken light bundle |
| 45 | projection |

What is claimed is:

1. Electrical connector with electrical connection elements, which electrical connector exhibits on one side a receiver part (14), wherein a light-guiding body 2 made of a transmitting material with at least one illuminating body (11) is inserted into said receiver part (14), and wherein feed lines (24, 25) for the contact pins (12, 13, 19) are guided through said receiver part (14), wherein the light-guiding body (2) has at least two arms (4, 5, 6, 7), which arms exhibit in each case an ellipsoidal or paraboloidal or cylindrical shaped or planar-pyramidal formed surface in direction of a longitudinal axis (22) of a main radiation direction of the illuminating body (11) at abutting ends of the arms (4, 5, 6, 7) on a side disposed opposite to the illuminating body (11), wherein said planar, inclined or curved surfaces form in each case a reflecting deflection face of the respective arm (4, 5, 6, 7), and wherein said surfaces are capable of deflecting light mainly in axial direction within the respective arm (4, 5, 6, 7) at an angle of about 90 degrees relative to a main radiation direction of the illuminating body, wherein the reflecting deflection faces (8, 9, 10, 18) of the arms (4, 5, 6, 7) in each case jointly connect in a tip (23) or edge directed into the light-guiding body (2) at an axis (22) of the main radiation direction of the illuminating body (11), wherein the light-guiding body (2) exhibits a recess (15) below the tip (23) or edge, wherein the illuminating body (11) is disposed in the recess (15), wherein the illuminating body (11) reaches within the recess (15) into the region of the abutting ends of the arms (4, 5, 6, 7) and the recess reaches up to below the tip (23).

2. Connector according to claim 1, wherein the plug exhibits a beaker (3) on the side disposed opposite to the illuminating body (11), which beaker (3) is attached with its bottom to the arms (4, 5, 6, 7) of the light-guiding body and contains the contact pins (12, 13, 19), wherein the plug (1) and the beaker (3) are formed cylindrically or parallelepipedally, and wherein front faces of the arms (4, 5, 6, 7) are disposed in a jacket plane of the cylinder or at delimiting faces of a parallelepiped of the plug (1).

3. Connector according to claim 1, wherein the light-guiding body (2) exhibits two or three or five or six arms (4, 5, 6, 7) disposed relative to each other to form overall a star shape, wherein neighboring arms enclose equal angles between each other, wherein the arms abut at a center of the star shape, and wherein the illuminating body (11) is disposed below the abutting ends of the arms (4, 5, 6, 7).

4. Connector according to claim 1, wherein the inclined surfaces of the oppositely disposed arms (4, 5, 6, 7) of the light-guiding body (2) are in each case formed as holographic lenses or holographic mirrors, wherein the inclined surfaces form in each case the reflecting deflection face of the respective arm (4, 5, 6, 7).

5. Connector according to claim 1, wherein the illuminating body is furnished with an elongated recess (30) having a closed end and having an open end; wherein the illuminating body is disposed in the elongated recess (30) near the open end;
   wherein the inclined surfaces, which in each case form the reflecting deflection face for the respective arm (4, 5, 6, 7), define part of the closed end of the elongated recess (30) elongated and form a projection (45) from the closed end of the elongated recess (30) into the interior of the elongated recess (30).

6. Connector according to claim 1, wherein the light-guiding body (34) has several coordinated inclined and reflecting surfaces, wherein in each case light (44), emitted by an illuminating body (43) between the coordinated surfaces, are reflected multiply within the light-guiding body (34) and are guided to the outside of the light-guiding body (34).

7. The electrical connector according to claim 1, wherein the electrical connection elements are selected from a member of the group consisting of electrically contacting contact pin, electrical contact socket, plug element, coupling element and combinations thereof.

8. Connector according to claim 1, wherein the arms (4, 5, 6, 7) are radially formed at one end of the light-guiding body (2, 26) and form two antiparallel pairs of arms (4, 5, 6, 7) aligned like a cross and disposed in a plane, and wherein the arms (4, 5, 6, 7) are of solid material.

9. Connector according to claim 8, wherein the illuminating body is identical to the light-guiding body and exhibits the desired shape of the light-guiding body.

10. Connector according to claim 8, wherein the light-guiding body (34) has several coordinated inclined and reflecting surfaces, wherein in each case light bundles (44), starting from an illuminating body (43) between the coordinated surfaces, are reflected multiply within the light-guiding body (34) and are guided to the outside of the light-guiding body (34).

11. Connector according to claim 8, wherein a plurality of illuminating bodies (31) are employed inside of one and the same light-guiding body (46) instead of one single illuminating body.

12. Connector according to claim 1, wherein the light-guiding body (47) includes deflection faces adapted to deflect the light of at least one illuminating body (31) into at least one or several preferred directions.

13. Connector according to claim 12, wherein the light coming from at least one illuminating body (31) and passing through the light-guiding body (47) is reflected onto at least two different reflection faces of two different arms through a mirror face of the light-guiding body (47), and the light exits focused from the arms.

14. Connector according to claim 13, wherein the light coming from at least one illuminating body (31) and expanding in the light-guiding body (47) is thrown onto at least two different reflection faces of two different arms through a mirror face of the light-guiding body (47), and the light exits focused from the arms.

15. An electrical connector comprising
   a receiver part of tubular topology extending in a longitudinal direction, having a first end, having a second end, and forming an inner space;
   a light guiding body made of a light-transmitting material and placed into the inner space of the receiver part, having an open space and including a light-transmitting projection protruding beyond the first end of the receiver part, wherein the light-transmitting projection is formed with a plurality of arms extending substantially perpendicular and in a radial direction relative to said longitudinal direction, wherein the light-transmitting projection is formed with respective reflecting surfaces deflecting light, travelling substantially in said longitudinal direction in the inner space from the second end to the first end, to enter respective ones of said arms;
   an illuminating body disposed in the open space for furnishing said light travelling substantially in said longitudinal direction;
   an insulating support attached to the light guiding body at the light-transmitting projection on a side of the light-transmitting projection disposed relatively remote to the open space;
   electrical connection elements mounted on the insulating support.

16. The electrical connector according to claim 15, wherein the electrical connection elements are pins.

17. The electrical connector according to claim 15, wherein the electrical connection elements are sockets.

18. The electrical connector according to claim 15 further comprising
   feed lines for the electrical connection elements are guided through said receiver part, wherein the arms exhibit an ellipsoidal or paraboloidal or cylindrical shaped or planar-pyramidal formed surface;
   wherein said planar, inclined or curved surfaces form in each case the reflecting deflection face of the respective arm and wherein said surfaces are capable of deflecting the light mainly in axial direction within the respective arm at an angle of about 90 degrees relative to the main radiation direction of the illuminating body, wherein the reflecting deflection faces of the arms in each case jointly abut in a tip or edge directed into the light-guiding body at the axis of the receiver and of the main radiation direction of the illuminating body, wherein the light-guiding body exhibits a recess below the tip or edge, wherein the illuminating body is disposed in the recess, wherein the illuminating body reaches within the recess into the region of the abutting ends of the arms and the recess reaches up to below the tip.

19. The electrical connector according to claim 15, wherein the light emitted from the light emitting body is passing through part of the open space free from a solid medium;
   wherein the respective reflecting surfaces deflecting light are outer surfaces of the receiver part defining the open space and reflect light travelling substantially in said longitudinal direction into the open space;
   further comprising
   a light transmitting inner surface of the light guiding part for transmitting light deflected by the respective reflecting surfaces into the light guiding body and to enter respective ones of said arms.

20. An electrical connector having electrical connection elements, which electrical connector exhibits on one side a receiver part (14), wherein a light-guiding body (2) made of a transmitting material with at least one illuminating body (11) is inserted into said receiver part (14), and wherein feed lines (24, 25) for the contact pins (12, 13, 19) are guided through said receiver part (14), wherein the light-guiding body (2) has at least two arms (4, 5, 6, 7), wherein the respective arm (4, 5, 6, 7) is disposed at an angle of about 90 degrees relative to a main radiation direction of the illuminating body, wherein the arms exhibit in each case a light deflecting surface directing light coming from the light-guiding body along a longitudinal axis (22) of a main radiation direction of the illuminating body (11) into the respective arm at abutting ends of the arms (4, 5, 6, 7) on a side disposed opposite to the illuminating body (11), wherein said light deflecting surface forms in each case a deflection face of the respective arm (4, 5, 6, 7), and wherein said light deflecting surface is capable of deflecting light mainly into an axial direction of and within the respective arm (4, 5, 6, 7), wherein the light deflecting surfaces (8, 9, 10, 18) of the arms (4, 5, 6, 7) in each case jointly connect in a singular geometric element (23) directed into the light-guiding body (2) at the longitudinal axis (22) of the main radiation direction of the illuminating body (11), wherein the light-guiding body (2) exhibits a recess (15) below the singular geometric element (23), wherein the illuminating body (11) is disposed in the recess (15), wherein the illuminating body (11) reaches within the recess (15) into the region of the abutting ends of the arms (4, 5, 6, 7) and the recess reaches up to below the singular geometric element (23).

\* \* \* \* \*